Patented Nov. 23, 1926.

1,607,605

UNITED STATES PATENT OFFICE.

EDGAR C. BRITTON, OF MIDLAND, MICHIGAN, ASSIGNOR TO THE DOW CHEMICAL COMPANY.

METHOD OF MAKING PYRROLIDINE DERIVATIVES.

No Drawing.   Application filed October 1, 1925.  Serial No. 59,970.

Pyrrolidine, which is a colorless strongly alkaline base, is usually represented by the formula

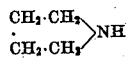

and, as indicated by such formula, may be also designated tetramethylene-amine (Ladenburg, B. 19, 782; 20, 442). Various methods are known for the preparation of this compound and derivatives, several being described for example in Bernthsen's "Text Book of Organic Chemistry" (1912 Ed. p. 519).

The present improved method of making pyrrolidine and derivatives thereof is based on the discovery that a principle of ring closure, that is, of converting carbon chains to nitrogen ring compounds, which was originally disclosed by Loeffler (B. 42, 3427), may be successfully utilized in this connection. The invention, accordingly, consists of the steps hereinafter fully described and particularly pointed out in the claims, the following description presenting but several of the various ways in which the principle of the present invention may be utilized.

Loeffler's method of ring closure consists in reacting a secondary aliphatic amine, containing a methyl group three carbon atoms removed from the nitrogen atom, with sodium hypobromite, thus forming a nitrogen-bromine derivative. The latter upon being heated at 100 degrees C. for three hours and finally at 135 degrees C. for one-half hour, forms hydrogen bromide and a pyrrolidine derivative. This type of reaction may be represented by the following equations wherein R represents the hydrogen-containing radical.

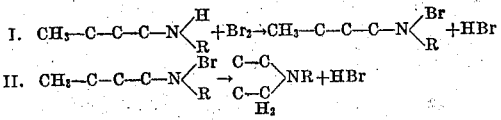

I have now discovered that the foregoing types of reactions are practically applicable to any secondary amines having the methyl group ($CH_3$) three atoms removed from the nitrogen, providing the compound is such that only the nitrogen atom will react with a halogen, as indicated in Equation I.

I have also discovered certain procedure that directs conditions toward the reaction represented by Equation II. In accordance with my invention I run the nitrogen-bromine compound, alone or in solution in a neutral solvent, e. g. in benzene, into a cold concentrated mineral acid, for instance sulphuric acid, and then raise the temperature of the resultant acid solution directly to 145 degrees C., whereupon the reaction proceeds quickly, reaching a conclusion in a few minutes. Furthermore, I apply a suitable vacuum to such acid solution during the foregoing heating step, and the hydrobromic acid formed is removed and does not react with the sulphuric acid, as it might otherwise do, to form sulphur-dioxide and bromine.

In place of sulphuric acid, phosphoric acid may be used in carrying out the foregoing improved process and also, of more importance, nitrogen-chlorine compounds will react in such process almost as readily as the nitrogen-bromine compounds.

The following examples will serve to illustrate the manner in which the foregoing improved process may be employed in the manufacture of pyrrolidine and certain specific derivatives thereof:—

Example 1. 25 g. of dibutyl amine are added to a cold solution of 1.5 molecules of sodium hypobromite (prepared by mixing 84 g. of 30% sodium hydroxide solution, 15.6 ccs. of liquid bromine and 200 g. of ice), thus forming N-bromo dibutyl amine. The bromo derivative is an oil which readily separates as a lower layer. This lower layer is run into 80 ccs. of cold concentrated sulphuric acid and readily passes into solution. The reaction vessel is then evacuated and the acid solution is heated at once to 110–115° C., whence the heat of reaction raises the temperature to 140°–150° C., hydrogen bromide gas being evolved rapidly. After maintaining this elevated temperature for ten minutes, the reaction mixture is cooled and poured into cold water. After neutralizing with alkali, the 1-butyl pyrrolidine is removed by steam distillation and separated from the water layer of the distillate. The base may be purified by the picrate method as practiced by Loeffler.

Butyl pyrrolidine is a colorless compound with an odor resembling pure nicotine and piperidine. It is poisonous and nauseating after working with it for some time. Its boiling point is 151° C. It changes yellow on exposure to sunlight but may be kept colorless in a dark bottle.

Example 2. By substituting an equivalent weight of di-isoamyl amine for the dibutyl amine in Exampe 1, 1-isoamyl 3-methyl pyrrolidine may be produced. B. P. 176° C.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. In a method of making pyrrolidine derivatives, the steps which consist in adding a nitrogen-halogen derivative of a secondary aliphatic amine containing a methyl group three carbons removed from the nitrogen atom, to a cold concentrated mineral acid, and then raising the temperature of the resulting acid solution directly to the reaction temperature.

2. In a method of making pyrrolidine derivatives, the steps which consist in adding a nitrogen-halogen derivative of a secondary aliphatic amine containing a methyl group three carbons removed from the nitrogen atom, to a cold concentrated mineral acid, and then raising the temperature of the resulting acid solution directly to the reaction temperature, said nitrogen-halogen derivative being thus added in a neutral solvent.

3. In a method of making pyrrolidine derivatives, the steps which consist in adding a nitrogen-halogen derivative of a secondary aliphatic amine containing a methyl group three carbons removed from the nitrogen atom, to a cold concentrated mineral acid, and then raising the temperature of the resulting acid solution directly to the reaction temperature, said nitrogen-halogen derivative being thus added in solution in benzene.

4. In a method of making pyrrolidine derivatives, the steps which consist in adding a nitrogen-halogen derivative of a secondary aliphatic amine containing a methyl group three carbons removed from the nitrogen atom, to a cold concentrated mineral acid, then raising the temperature of the resulting acid solution directly to the reaction temperature, and simultaneously applying a vacuum whereby the halogen acid is removed as it forms.

5. In a method of making pyrrolidine derivatives, the steps which consist in running a nitrogen-bromine derivative of a secondary aliphatic amine containing a methyl group three carbons removed from the nitrogen atom into cold concentrated sulphuric acid, and then raising the temperature of the resulting acid solution directly to approximately 145° C.

6. In a method of making pyrrolidine derivatives, the steps which consist in running a nitrogen-bromine derivative of a secondary aliphatic amine containing a methyl group three carbons removed from the nitrogen atom into cold concentrated sulphuric acid, and then raising the temperature of the resulting acid solution directly to approximately 145° C., said nitrogen-bromine derivative being thus added in a neutral solvent.

7. In a method of making pyrrolidine derivatives, the steps which consist in running a nitrogen-bromine derivative of a secondary aliphatic amine containing a methyl group three carbons removed from the nitrogen atom into cold concentrated sulphuric acid, and then raising the temperature of the resulting acid solution directly to approximately 145° C., said nitrogen-bromine derivative being thus added in solution in benzene.

8. The method of making 1-butyl-pyrrolidine, which comprises adding a nitrogen-halogen derivative of di-butyl amine to a cold concentrated mineral acid, and then raising the temperature of the resulting acid solution directly to the reaction temperature.

9. The method of making 1-butyl-pyrrolidine, which comprises running the nitrogen-bromine derivative of di-butyl amine into cold concentrated sulphuric acid, and then raising the temperature of the resulting acid solution directly to approximately 145° C.

10. The method of making 1-butyl-pyrrolidine, which comprises running the nitrogen-bromine derivative of di-butyl amine into cold concentrated sulphuric acid, then raising the temperature of the resulting acid solution directly to approximately 145° C. and simultaneously applying a vacuum whereby the hydrobromic acid is removed as it forms.

Signed by me, this 28th day of September, 1925.

EDGAR C. BRITTON.